United States Patent [19]
McGee

[11] Patent Number: 5,843,582
[45] Date of Patent: Dec. 1, 1998

[54] HEAT SEALABLE FILM

[75] Inventor: Dennis E. McGee, Penfield, N.Y.

[73] Assignee: Mobil Oil Corporation, Fairfax, Va.

[21] Appl. No.: 881,869

[22] Filed: Jun. 24, 1997

Related U.S. Application Data

[63] Continuation of Ser. No. 459,060, Jun. 2, 1995, abandoned, which is a continuation-in-part of Ser. No. 321,272, Oct. 11, 1994, abandoned.

[51] Int. Cl.$^6$ ............................ B32B 27/08; B32B 27/30; B32B 27/32
[52] U.S. Cl. ........................ 428/520; 428/516; 428/323; 428/349; 428/497; 428/499; 428/910
[58] Field of Search ..................... 428/516, 520, 428/323, 349, 497, 499, 910, 515

[56] References Cited

U.S. PATENT DOCUMENTS

| | | | |
|---|---|---|---|
| 2,795,564 | 6/1957 | Conn et al. | 260/29.6 |
| 3,365,410 | 1/1968 | Wesslau et al. | 260/29.6 |
| 3,753,769 | 8/1973 | Steiner | 117/138.8 |
| 3,822,175 | 7/1974 | Yuan | 161/93 |
| 4,058,645 | 11/1977 | Steiner | 428/331 |
| 4,058,649 | 11/1977 | Steiner | 428/518 |
| 4,629,657 | 12/1986 | Gulati et al. | 428/461 |
| 5,017,430 | 5/1991 | Chu et al. | 428/353 |
| 5,093,194 | 3/1992 | Touhsaent | 428/349 |
| 5,486,426 | 1/1996 | McGee et al. | 428/516 |
| 5,500,283 | 3/1996 | Kirk et al. | 428/349 |
| 5,529,834 | 6/1996 | Tsai et al. | 428/215 |
| 5,567,773 | 10/1996 | McGee et al. | 525/221 |
| 5,662,985 | 9/1997 | Jensen et al. | 428/195 |

FOREIGN PATENT DOCUMENTS 1003318  8/1962  European Pat. Off. .

*Primary Examiner*—Robert H. Harrison
*Attorney, Agent, or Firm*—Jessica M. Sinnott; Dennis P. Santini

[57] ABSTRACT

A heath sealable thermoplastic film is coated on at least one side with an acrylonitrile-containing coating containing from 25 wt. % to about 80 wt. % acrylonitrile. More specifically the film is coated on the inside with a polymeric coating comprising (i) from 25 to 50 wt. % of a nitrile such as acrylonitrile, (ii) from 40 to 75 wt. % of a monomer selected from the group consisting of an alkyl acrylate or 1,3-butadiene, and (iii) about 1 to 10 wt. % of a monomer selected from the group consisting of an ethylenically unsaturated carboxylic acid or sulfoethyl methacrylate, the coating having a calculated glass transition temperature ($T_g$) ranging from about 10° C. to less than about 50° C. The outside of the film is coated with an acrylic coating composition which can contain from 0 to about 80 wt. % acrylonitrile.

10 Claims, No Drawings

HEAT SEALABLE FILM

CROSS-REFERENCE TO RELATED APPLICATIONS

This is a continuation of copending application Ser. No. 08/459,060, filed on Jun. 2, 1995, now abandoned, which is a continuation-in-part of U.S. Ser. No. 08/321,272 filed on Oct. 11, 1994, now abandoned which is incorporated herein by reference in its entirety.

FIELD OF THE INVENTION

This invention relates to a heat sealable film.

BACKGROUND OF THE INVENTION

Thermoplastic films suitable for packaging products are often required to exhibit a variety of properties, including heat sealability, tensile strength, transparency, machinability and barrier properties.

In most processes for packaging products, such as potato chips, nuts, candy, biscuits, spices and similar foods, hardware such as nuts, bolts, screws and nails, the package is formed and filled by creating a heat-seal between two opposed layers of film to form a pocket and almost simultaneously sliding or dropping the product into the pocket. In these form and fill packaging techniques a continuous flat web of packaging film is fed around a form which shapes it into a tube, the tube is slipped over a hollow form and the free edges of the tube are sealed together. The tube so formed is then passed between a pair of hot sealing jaws which create a series of discrete packages by collapsing the film onto itself and forming a seal by the application of heat and pressure. The product is introduced into each package through the hollow form in the interval between the heat seals. During high operating speeds, the product is dropped into the package while the sealing jaws, which form the seal, are closed. With both vertical and horizontal form and fill sealing applications the heat seal should be strong enough to support and retain the product after the sealing jaws open to release the film. It is often desirable to release the sealing jaws soon after the seal is formed so a film which accomplishes this by exhibiting a high "hot tack" is very useful.

Additionally, in packaging applications there is a great demand for heat sealable films which can be subjected to temperatures high enough to seal the films without causing the substrate to cockle or pucker. One approach for achieving this is by coating a film substrate with a layer of heat sealable material which adheres strongly to the substrate and which can be melted at a temperature below the softening temperature of the substrate. Heat-sealable coatings with low melting temperatures are often preferred because the substrate is less likely to be damaged during heat sealing.

In the preparation of films useful for packaging purposes, the outside of the film or the side of the film which comes in direct contact with the hot sealer surfaces should have good hot slip and jaw release characteristics. Additionally, the film should have good machinability so that the wrapped product can be conveyed easily through the overwrapping machine without sticking to adjacent packages or the parts of the machine with which it comes into contact, which can cause production delays. The film should also have barrier properties. Acrylic-containing coatings which offer these properties are known. The acrylic-containing coating is applied to one side of the film substrate and another heat sealable coating, such as polyvinylidene chloride (PVDC), or another acrylic coating, is coated on the other side. Acrylic-containing coating formulations provide the film with a good coefficient of friction which contributes to good machinability characteristics. These acrylic-based coatings also provide the film with good barrier characteristics which improve flavor and aroma protection. Such coatings are described in U.S. Pat. Nos. 4,058,649 and 4,058,645. The PVDC coating or other type of acrylic coating is usually on the inside of the film and provides high seal strength, good hot tack characteristics and barrier properties. These heat sealable coatings have glass transition ("Tg") temperatures which are higher than room temperature. Such a coated film is disclosed in U.S. Pat. No. 4,403,464.

In the film packaging art, materials which can contribute to film damage by causing the film to pucker are often found either in the packaging materials themselves or in the packaged products. It has been found that oriented polypropylene films having acrylic and ethylene-acrylic acid copolymer-containing coatings are sensitive to some types of food additives, for example, the proprietary release agents used in starch based candies. These coatings can also be sensitive to natural oils found in spices such as black pepper, anise and nutmeg. When placed in contact with these aggressive materials, the oriented polypropylene films pucker and deform giving the package a wrinkled and pocked appearance. This can happen within hours of exposure at temperatures above about 29° C. (85° F.) and high humidity (above about 80% relative humidity) or even within two weeks at ambient temperatures and ambient humidity.

One solution to this problem has been to use a polyester film coated with PVDC. The PVDC coating offers moisture barrier properties. These films are useful in packaging starch-based candies, to preserve softness and prevent hardening. The polyester is not affected by the reactive materials used in the products. Significant amounts of PVDC are required for effective barrier properties. However, PVDC contains chlorine, a halogen. Halogenated substances have been the subject of environmental concern, and for this reason it is desirable to minimize the use of PVDC in films. Furthermore, polyester films usually have to be laminated to another web, such as polyethylene, for structural integrity (stiffness). This is undesirable because it is an expensive process step and the packaging poses recycling problems because of the two-web structure. Moreover, the polyester films are more expensive than oriented polypropylene.

U.S. Pat. No. 4,456,741 discloses heat sealable terpolymer compositions useful as pressure-sensitive adhesives for use with a backing material such as paper, polyester film or foamed polymers. The terpolymer heat sealable pressure-sensitive adhesive composition comprises butyl acrylate, N-vinyl-2-pyrrolidinone and styrene. Other heat sealable coatings are disclosed in U.S. Pat. No. 3,696,082; and East German Patent No. DD-146,604.

Cold sealable pressure-sensitive adhesives have been developed. These adhesives do not require the use of a heated element to seal the packages. However, these adhesives have high surface tack characteristics making them adhere to uncoated surfaces of the packaging film which makes them difficult to use because of film blocking (i.e. sticking).

Although low blocking coating compositions with a low seal temperature (of about 71° C. (160° F.)) can be obtained with ethylene-acrylic acid copolymer coatings, such as Mobil Chemical Company film product "100 LTSC", these polymeric coatings do not have adequate machinability for use on the outside of the web and will not seal to other types of acrylic-containing coatings. Therefore, acrylic or PVDC coatings (or other machinable surface coating) must be used on the outside of the packaging film. This limits such films to "fin-seal" type applications in which the inside of the film is sealed to itself. Many applications, however, require a film structure which can be lap sealed, in which the inside surface is sealed to the outside surface.

It is apparent from this film art that there is a need for a sealable coating formulation which has the good flavor and aroma properties of acrylic and the low temperature sealability of the ethylene acrylic acid but which is not sensitive to reactive materials and which does not stick to acrylic coatings at room temperature or temperatures below about 60° C., but which seals to acrylic coatings at or above 70° C. Additionally, a film is needed which is resistant to reactive materials without containing halogenated substances and which is easy to recycle.

Sometimes the advantages of adding to the substrate materials which offer moisture and aroma barrier properties will outweigh the disadvantages which compromise the appearance and protective properties of the film and cause handling problems. Some additives incorporated into the film substrate to improve the moisture and aroma barrier properties of the film will migrate from the substrate to the surface of the film and cause various problems, depending upon the additive. Terpenes are useful moisture barrier additives and for this purpose they are often incorporated into oriented polypropylene film substrates. However, terpenes have been found to migrate through the known coatings used on oriented polypropylene substrates. This additive migration has been found to reduce the hot tack of the film, which is particularly important in the vertical form and fill sealing processes. Terpene migration has also been reported to cause flavor degradation of foods. The components of some films will impart an undesirable odor and/or flavor to foods and other products.

Thus, there is a need for a coating composition for polypropylene which is not damaged by these aggressive materials and which can block migration of terpenes and other hot melt polymers.

SUMMARY OF THE INVENTION

The invention relates to a heat sealable film comprising a thermoplastic substrate having a first side and a second side, 1) the first side having (a) a polymeric coating composition comprising:

(i) more than about 25 wt. % and up to about 80 wt. % of a nitrile monomer having the formula:

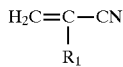

where $R_1$ is hydrogen or methyl;

(ii) from about 40 to about 75 wt. % of a monomer selected from the group consisting of an alkyl acrylate having the structural formula:

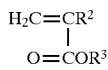

where $R^2$ is hydrogen or alkyl containing from 1 to 4 carbon atoms and $R^3$ is an alkyl group containing from 1 to 4 carbon atoms and 1,3-butadiene;

(iii) from about 1 to about 10 wt. % of a monomer selected from the group consisting of an alpha or beta ethylenically unsaturated carboxylic acid or sulfoethylmethacrylate, the monomers (i) (ii) and (iii) being combined in weight percent amounts based on the total weight of the polymeric coating sufficient to achieve a glass transition temperature ranging from about 10° C. to about 80° C.; and (2) the second side having (b) a coating comprising an acrylic-containing composition.

An object of the invention is to provide a coating formulation which has good barrier properties, resistance to aggressive materials at high temperatures, and which inhibits aggressive materials from migrating from the substrate to the packaged product and vice-versa.

A further object of the invention is to provide a coated oriented polypropylene film which resists deformation at high temperatures and humidity and upon exposure to aggressive materials, but which does not contain halogenated materials and which need not be laminated to another film for structural integrity.

An important feature of the invention is the discovery of an acrylonitrile coating composition which blocks the migration of aggressive materials.

Another important feature of the invention is the discovery of an acrylonitrile coating composition for a packaging film which effectively prevents odor and taste degrading materials from impacting the flavor or smell of articles which are wrapped in the film without the use of a liner.

DETAILED DESCRIPTION OF THE INVENTION

These objectives are achieved by formulating a coating for a polyolefin film, the coating comprising:

(i) more than about 25 wt. % and up to about 80 wt. % of a nitrile monomer having the formula:

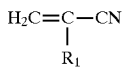

where $R_1$ is hydrogen or methyl;

(ii) from about 40 to about 75 wt. % of a monomer selected from the group consisting of an alkyl acrylate having the structural formula:

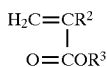

where $R^2$ is hydrogen or alkyl containing from 1 to 4 carbon atoms and $R^3$ is an alkyl group containing from 1 to 4 carbon atoms and 1,3-butadiene;

(iii) from about 1 to about 10 wt. % of a monomer selected from the group consisting of an alpha or beta ethylenically unsaturated carboxylic acid or sulfoethylmethacrylate, the monomers (i) (ii) and (iii) are combined in weight percent amounts based on the total weight of the polymeric coating sufficient to achieve a glass transition temperature ranging from about 10° C. to less than about 80° C.

In a more specific embodiment, the invention relates to a heat sealable film comprising a polyolefin substrate having an inside surface and an outside surface, (1) the inside surface having (a) a heat sealable polymeric coating thereon comprising:

(i) more than about 25 wt. % to about 50 wt. %, more specifically about 25 wt. % to about 40 wt. %, of a nitrile monomer having the formula:

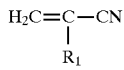

where $R^1$ is hydrogen or methyl;

(ii) from about 40 to about 75 wt. %, more specifically about 55 wt. % to about 75 wt. %, of at least one monomer selected from the group consisting of an alkyl acrylate having the structural formula:

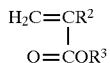

where $R^2$ is hydrogen or alkyl containing from 1 to 4 carbon atoms and $R^3$ is an alkyl group containing from 1 to 10 carbon atoms and 1,3-butadiene;

(iii) from about 1 to about 10 wt. %, more specifically about 1 wt. % to about 6 wt. %, of at least one monomer selected from the group consisting of an alpha or beta ethylenically unsaturated carboxylic acid or sulfoethylmethacrylate, the monomers being combined in weight percent amounts based on the total weight of the polymeric coating sufficient to achieve a calculated glass transition temperature ranging from about 10° C. to about 50° C., (2) the outside surface having thereon (b) a coating comprising an acrylic-based coating composition, the (a) heat sealable polymeric coating being sealable to the (b) coating at temperatures ranging from about 70° C. to about 125° C.

The monomer (i) is selected from the group consisting of an ethylenically unsaturated nitrile specifically a acrylonitrile or methacrylonitrile.

The monomer (ii) is selected from the group consisting of methyl acrylate, ethyl acrylate, isopropyl acrylate, propyl acrylate, butyl acrylate, isobutyl acrylate, methyl methacrylate, 1,3-butadiene and mixtures thereof.

The monomer (iii) is selected from the group consisting of methacrylic acid, acrylic acid, itaconic acid, crotonic acid, sulfoethylmethacrylate, maleic acid and mixtures thereof.

A film coated on the inside surface with the (a) polymeric composition of this invention exhibits low blocking tendencies to the (b) acrylic coating composition on the outside surface at temperatures below the $T_g$ of the (b) acrylic coating. However, a good seal can be formed between the two coatings at higher temperatures, typically, above the $T_g$ of the acrylic coating, e.g. above about 40° C.

In one embodiment of the invention, the (b) acrylic coating composition on the outside surface of the film comprises more than about 50%, by weight of the entire coating composition, of an acrylic polymer or copolymer. Optionally, this coating can be free of acrylonitrile. Typically, the (b) coating comprises a significant proportion of a monomer such as acrylic acid, methacrylic acid, ester of acrylic acid or ester of methacrylic acid. The term "acrylic coating" is a broad term which covers conventional acrylic protective film coatings mainly used for flavor and aroma barrier properties, machinability, printability and lap sealability. These acrylic coatings are described in U.S. Pat. Nos. 4,058,645 and 4,058,649 which are incorporated herein by reference in their entireties.

In another embodiment of the invention, the (b) acrylic coating on the outside surface comprises acrylonitrile and the formulation is the same or different from the (a) acrylonitrile coating formulation used on the inside of the substrate. The acrylic coating can be the same as the coating described in copending U.S. application Ser. No. 08/131, 500, filed on Oct. 4, 1993, which is incorporated herein by reference in its entirety. Polymer materials such as acrylonitrile and ethylene acrylic acid can be present in the (b) acrylic-based polymer coating, typically in amounts up to about 80 wt. %, typically about 40 wt. % to about 80 wt. % by weight of the acrylic monomer. If the amount of non-acrylic materials, such as acrylonitrile, exceed about 10 wt. % or more, an additive having antiblocking properties may be needed. It has been found that the calculated $T_g$ of the coating on the outside of the film, preferably, ranges from about 35° C. to about 80° C., especially when it comprises acrylonitrile.

The acrylic-based coating can be formulated with particulates such as polyethylene, silicon and silicone, silica (including colloidal and fumed silica), talc, or other particles ranging in size from 0.02 to 10.0 microns.

Thus, in a still further embodiment, the invention relates to a heat sealable film comprising a polyolefin substrate having an inside surface and an outside surface, (1) the inside surface having (a) a heat sealable polymeric coating comprising:

(i) more than about 25 wt. % to about 50 wt. % of a nitrile monomer having the formula:

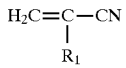

where $R^1$ is hydrogen or methyl;

(ii) from about 40 to about 75 wt. % of at least one monomer selected from the group consisting of an alkyl acrylate having the structural formula:

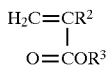

where $R^2$ is hydrogen or alkyl containing from 1 to 4 carbon atoms and $R^3$ is an alkyl group containing from 1 to 10 carbon atoms and 1,3-butadiene;

(iii) from about 1 to about 10 wt. % of at least one monomer selected from the group consisting of an alpha or beta ethylenically unsaturated carboxylic acid or sulfoethylmethacrylate, the monomers being combined in weight percent amounts based on the total weight of the polymeric coating sufficient to achieve a calculated glass transition temperature ranging from about 10° C. to about 50° C., (2) the outside surface having (b) a coating comprising an acrylic-based coating composition comprising about 40 to about 80 wt. % of a nitrile monomer having the formula:

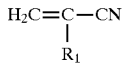

where $R^1$ is hydrogen or methyl; e.g., acrylonitrile and methacrylonitrile, the coating having a calculated $T_g$ ranging from about 35° C. to about 80° C., the (a) heat sealable polymeric coating being sealable to the (b) coating at temperatures ranging from about 70° C. to about 125° C.

Using a high concentration of acrylonitrile in the (a) coating on the inside film surface produces a film having improved resistance to aggressive materials as compared to the same films containing lower concentrations of acrylonitrile. However, increasing the acrylonitrile concentration above about 50 wt. % in formulating the inside coating raises the glass transition temperature of the coating which makes the coating more brittle. When packages are formed and handled, brittle inside coatings are susceptible to a condition known as flex-cracking. Flex-cracking compromises the chemical resistance of the film. Thus, the most preferred acrylonitrile concentration for purposes of making the inside coating of this invention ranges from more than about 25 wt. % up to about 50 wt. % based on the entire weight of the (a) polymer composition. This provides a balance between chemical resistance and film flexibility.

Although the glass transition temperature is important, the desired glass transition temperature cannot be achieved by just any monomer. That is, attaining the target glass transition temperature by increasing the concentration of, for example, the (iii) monomer results in a moisture sensitive film.

Using a coating on the outside surface which has a higher $T_g$ than the coating of the inside surface provides a film with excellent qualities. For this reason, the (b) coating can be an all-acrylic coating which has a calculated $T_g$ up to about 80° C. Thus, the concentration of monomers which contribute to high $T_g$ values, such as acrylonitrile, can exceed 50 wt. % in the coating for the outside surface.

The invention also relates to an overwrapped article, comprising:

(1) an article; and (2) an overwrap for the article, the overwrap comprising:

(a) a heat sealable thermoplastic film comprising a substrate and film properties improving amount of a film additive, the substrate having a first side and a second side, the first side being in closer proximity to the article than the second side, the first side having a heat sealable polymeric coating composition comprising a nitrile monomer; a monomer selected from the group consisting of an alkyl acrylate; and a monomer selected from the group consisting of an alpha or beta ethylenically unsaturated carboxylic acid, the monomers being combined in weight percent amounts based on the total weight of the polymeric coating sufficient to achieve a glass transition temperature ranging from about 10° C. to less than about 50° C.;

the second side having a coating composition comprising an acrylic containing composition.

The coating of this invention can be made by conventional emulsion polymerization processes.

The emulsion polymerized polymer formulation for making the (a) coating, typically, prepared by a conventional emulsion polymerization process. The polymerization is carried out in the presence of water, an emulsifying agent and a free radical catalyst. Typical free radical catalysts include hydrogen peroxide, ammonium or potassium persulfate or a redox type catalyst, such as mixtures of persulfates with alkali metal bisulfites, thiosulfates or hydrosulfites. Generally, the total amount of catalyst employed is in the range of from about 0.1% by weight to about 2% by weight based on the total weight of the monomer. The emulsion polymerization is typically carried out in the presence of one or more anionic, nonionic or cationic emulsifiers such as, for example, an alkyl carboxylic acid salt, a phosphoric acid salt, an alkyl sulfate salt, an alkyl sulfonate salt, an alkyl aryl ether alcohol or an alkyl aryl polyether sulfate salt. Generally, the total amount of emulsifier employed is from about 0.01 to about 2.0 percent by weight based on the total amount of water.

A chain transfer agent, such as, isooctyl thioglycolate, thioglycerol or dodecylmercaptan can be employed in the emulsion polymerization process. Usual amounts range from about 0.1 to 5% by weight based on the weight of total monomer.

The polymerization can be conducted in a redox system or in a higher temperature thermal process using a persulfate-type initiator or an azobis isobutyrlnitrile initiator.

In general the polymerization is carried out at a temperature of from about 40° C. to about 100° C., preferably about 60° C. to about 80° C., at a pressure in the range of from about 0 psig (10 kPa) to about 30 psig (308 kPa). A thermal polymerization is carried out at the higher range of these temperatures typically above about 70° C. The reaction can be conducted in glassware with a reflux condenser. This stage is usually carried out in the presence of an inert gas, such as nitrogen. The polymerization is generally carried out for a time ranging from about 1 to about 8 hours, preferably about 3 to 4 hours. After completion of the polymerization reaction, the pH of the polymer can be adjusted to up to 10, more specifically, from about 6 to about 10.

A two-stage polymerization process is also contemplated, generally the second stage polymerization is performed under the same temperature and pressure conditions as in the first stage. A preformed seed latex is made to which up to about 95% of the remaining amount of monomer feed is gradually fed in a second stage over a period of from about 2 to about 5 hours. The total reaction time of the second stage will usually range from about 4 to about 6 hours.

In one embodiment of the invention there is a two-stage polymerization in which the seed or core latex comprises up to about 50 wt. % of a different polymer such as a polymer described in U.S. Pat. No. 5,070,164. To this is added, as the remaining monomer feed, the monomer feed of this invention.

In the coating of this invention, usually, one monomer is selected from each of groups (i), (ii) and (iii) to produce a terpolymer. However, the formulation can be made from more than one monomer of each group.

A crosslinking agent may be useful. Low levels, usually less than 5 wt. %, of a crosslinking agent, such as divinylbenzene or 1,3-butylene glycol dimethacrylate or any other crosslinking agent known in the art, may also be employed, but is not required. It was found that the effect of the chain transfer agent, typically iso-octyl thioglycolate, which lowers the molecular weight can be balanced by the effect of the crosslinking agent which increases the molecular weight; therefore, when higher levels of crosslinking agent are used, higher levels of the chain transfer agent are usually used and vice versa. This helps to balance the properties of cohesive strength and sealability.

The emulsion polymers of the (a) coating have a weight average molecular weight ranging to about 150,000, preferably from about 20,000 to about 90,000 as determined by gel permeation chromatography (GPC). The polymer has a calculated glass transition temperature (Tg) of from at least about 10° C., usually about 15° C. to about 50° C. We found that lower glass transition temperatures, typically less than 15° to 20° C. are best because at those temperatures there is a good balance between flexibility and barrier properties, such as chemical resistance. The foregoing can vary depending upon the comonomers used. It should be noted that the measured $T_g$ values will typically be higher than the calculated $T_g$ values for acrylic polymers containing acrylonitrile.

The diameter of the polymer particles are generally in the range of from about 0.05 to about 0.3 microns, particularly for latex which is not alkali-soluble.

The glass transition temperature of acrylonitrile is about 97° C. The glass transition temperature of homopolymers from the (ii) and (iii) monomeric groups are listed in Table 1.

TABLE 1

| | Homopolymer Tg (°C.) |
|---|---|
| Second Monomer Group | |
| Methyl acrylate | 8 |
| Ethyl acrylate | −22 |
| Isopropyl acrylate | −3 |
| Butyl acrylate | −54 |
| Isobutyl acrylate | −43 |
| Third Monomer Group | |
| Acrylic acid | 106 |
| Methacrylic acid | 185 |
| Itaconic acid | — |
| Sulfoethyl methacrylate | — |
| Maleic acid | — |
| Crotonic acid | — |

The Tg of the polymer is related to the ratios of the weight fractions of the monomeric components and the Tg's of these components, so that when a terpolymer made from three monomers is being analyzed, $$\frac{1}{T_g} = \frac{W_{f1}}{T_{g1}} + \frac{W_{f2}}{T_{g2}} + \frac{W_{f3}}{T_{g3}}$$

where:
$T_g$=the $T_g$ of the terpolymer
$T_{g1}$=the $T_g$ of the first monomer;
$T_{g2}$=the $T_g$ of the second monomer;
$T_{g3}$=the $T_g$ of the third monomer;
$W_{f1}$=the weight fraction of the first monomer;
$W_{f2}$=the weight fraction of the second monomer; and,
$W_{f3}$=the weight fraction of the third monomer.

After drying, the resulting formulation adheres to the packaging film substrates even after exposure to moisture. That is, the formulations retain a significant amount of their original bond strength even after immersion in water. Once solidified by drying, the (a) coated surface does not adhere to non-treated, uncoated film surfaces such as untreated polypropylene or (b) acrylic-based surface coatings. However, by conventional heat sealing techniques the coated film surface will adhere to a (b) acrylic-based surface coating.

The low adhesion at temperatures below the $T_g$ of the coatings is an important feature of the invention for machinability. The coatings present a smooth, non-tacky surface which will not block to similar or different acrylic-based surface coatings under normal operating conditions.

It has been found that the coatings are heat sealable, but at relatively low temperatures. The surfaces, when placed in contact with each other, under pressure, and elevated temperatures, usually above the $T_g$ of the (b) coating, typically from about 70° C. up to about 125° C. will become cohesive forming a strong bond to each other. With certain polymers, such as acrylic, the bond created can be stronger than the film itself. The seal temperature required can be effected by the thickness of the composition on the substrate; that is, thicker substrates can require higher temperatures for sealability. As those skilled in the art will understand, the pressures required and seal times (time required to form a seal) will vary depending upon the temperatures. Typically, the pressures will range from about 0.5 (3.4 kPa) to about 100 psi (690 kPa) and seal time will range from a few milliseconds up to about 10 seconds.

The (a) emulsion polymer formulations of the present invention are very useful for imparting high seal bond strength to packaging film substrates, particularly coated polyolefin film, such as polypropylene film substrates. Other substrates which may be used include oriented polypropylene (uniaxially or biaxially oriented), coextruded films, white opaque film (such as a film comprising oriented polypropylene containing a strata of voids), cellophane, high density polyethylene and linear low density polyethylene.

In one specific aspect of this invention, the film substrate is primed with a material that helps to anchor the coatings. Typical primers include epoxy-type primers such as a polystyrene latex which contains at least one epoxy functionality, melamine formaldehyde or polyethyleneimine.

Known techniques can be employed for applying the (a) and (b) compositions to the substrate. For example, when impregnating or saturating the substrate, it may be dipped or sprayed. If the substrate is coated, this may be accomplished by dipping, spraying or by employing a roller, spreading knife, brush or the like. Generally, for the best crimp sealability, the emulsion polymer formulation should be applied at a low level, typically, applied in an amount of from about 0.3 to 5 g/1000 sq. in., preferably about 0.5 to 1.5 g/1000 sq. in. to the film substrate.

The emulsion polymerization formulation of the present invention may be compounded with, or have mixed therein, other known ingredients or stabilizers, antifoaming agents, dying adjuvants, pigments, waxes, corn starch, silica, talc and the like or other compounding aids to control surface tack and other surface properties. Thickeners or bodying agents may be added to the polymers so as to control the viscosity of the polymer and thereby achieve the proper flow properties for the particular application desired.

The coating composition of this invention provides effective barrier properties which inhibit the migration of aggressive materials to which the film is exposed either by virtue of their presence in the film itself or in the product to be packaged. Aggressive materials are those which can cause the known films to deform under appropriate temperature and humidity conditions and materials which can migrate through the known films. Specific examples of aggressive materials include the oils found in spices, synthetically or formulated scented or flavored oils, proprietary release agents added to candies to prevent them from sticking to each other and/or the packaging materials, proprietary materials used to adhere the packaging film to another film, such as a tear strip, and moisture barrier additives such as terpenes and terpene-containing materials, and oils used in some printing inks, such as McGee oil. Particularly troublesome spices include clove, anise, pepper, nutmeg and the like. Examples of synthetic or natural products which contain reactive materials include citrus air fresheners such as lemon or orange, apple or spice scented air fresheners, synthetic or naturally scented cedar blocks, cleaning products such as room deodorizers and drop-in commode cleaners and similar strongly scented or flavored products. Typically, it is desirable to wrap these products with the thermoplastic film without a protective liner. Therefore, films of this invention are desirable as they will not deform or otherwise fail upon exposure to these aggressive materials.

The aggressive materials even when not added to the film during manufacture, can deform the film by virtue of their presence in the packaged product. The aggressive material will be able to contact the inside of the film even when separated by a permeable liner so that the film is not directly in contact with the product.

As mentioned above, one of the advantages of this invention is the discovery that the acrylonitrile-containing coating prevents problems posed by terpenes which are often employed for film moisture barrier enhancing properties.

Terpene hydrocarbons are generally described in *System of Nomenclature for Terpene Hydrocarbons, Acyclics, Monocyclics and Bicyclics* (American Chemical Society, 1955), p.p. 3. Terpene hydrocarbons contemplated include not only $C_{10}H_{16}$ hydrocarbons but also their hydrogenated derivatives and other hydrocarbons possessing similar fundamental chemical structures. They may be acyclic or cyclic, simple or complex and found in naturally occurring substances or manufactured synthetically. Many of the carbon skeletons of terpene hydrocarbons consist of multiples of the isoprene nucleus, $C_5H_8$. The cyclic terpene hydrocarbons can be classified as monocyclic, bicyclic or tricyclic. Sesquiterpenes $C_{15}H_{24}$ and polyterpenes $(C_5H_8)_x$ may even fall within the broad classification of terpenes. Also contemplated are oxygenated and hydrogenated derivatives and other types of derivatives. The terpene polymers can be produced by polymerization and/or copolymerization of terpene hydrocarbons such as the monocyclic and bicyclic monoterpenes and their mixtures, including allo-ocimene, carene, isomerized pinene, pinene, dipentene, terpinene, terinolene, limonene, turpentine, a terpene cut or fraction and various other terpenes. The polymerization and/or copolymerization may be followed by hydrogenation under pressure. Preferred terpene polymers are those selected from the group consisting of polymerized d-limonene, polymerized beta pinene, or a polymerized synthetic approximation of d-limonene and beta-pinene and mixtures thereof, Typically, the polyterpenes contemplated have a molecular weight of from about 800 to about 15,000 $M_n$.

EXAMPLES OF THE INVENTION

Example 1

This example illustrates preparation of an emulsion-polymerized, nitrile-containing acrylic terpolymer formulation which is useful as an inside coating.

Using a semi-continuous batch process, a latex was prepared by continuously adding and metering 2412 grams of the total monomer feed over a period of 2.5 hours to a reactor containing 2900 grams of water, 6 grams of 30% sodium lauryl sulfate, as an emulsifier, and 72 grams of freshly prepared 10% aqueous ammonium persulfate, a free-radical catalyst. The premixed total monomer feed contained 59.7% (1440 grams) ethyl acrylate, 36.8% (888 grams) acrylonitrile, 3% (72 grams) acrylic acid, and 0.5% (12 grams) iso-octyl thioglycolate (as a chain-transfer agent). A feed containing 12.4 grams of sodium dodecylbenzenesulfonate dissolved in 1000 grams water was added over a 3.0-hour period. The emulsion polymerization reaction was maintained at 80°±5° C. in a jacketed, glass-lined pressure vessel made by Pfaudler which has a capacity of about 3 gallons. The agitation was set at 150 rpm. After addition of all the feeds, approximately 2450 grams of water were used to flush the various tanks and feed lines and to reduce the solids content of the emulsion. The diluted emulsion was held at 80°±5° C. for one hour after the flushes were added, then 120 grams of 30% aqueous ammonia, diluted to a total of 2250 grams with deionized water, were added to the emulsion. The mixture was held at 80°±5° C. for an additional hour, then cooled.

Example 2

In making the acrylonitrile coating of this Example, substantially the same process as Example 1 was followed except the monomer composition was: 68.6% (1656 grams) methyl acrylate, 27.9% (672 grams) acrylonitrile, 3% (72 grams) acrylic acid, and 0.5% (12 grams) iso-octyl thioglycolate.

The following table sets forth the properties of each polymer latex of the above Examples 1 and 2.

TABLE 2

| Characterization of Polymer Coatings | | |
|---|---|---|
| Latex Properties | Example 1 | Example 2 |
| Total Solids (%) | 21.7 | 21.6 |
| Alkali solubility | Partially Soluble | Soluble |
| pH | 9.5 | 9.0 |
| $T_g$ [calculated] (°C.) | 16 | 31 |
| $T_g$ [measured] (°C.) | 40 | 50 |
| Residual acrylonitrile, ppm | 10 | 12 |

Example 3

This example describes the preparation of coated films.

An 80-gauge polypropylene film was coated on the outside with an acrylic coating containing 100 parts of a polymer made from methyl acrylate, methylmethacrylate and methacrylic acid. The $T_g$ of the terpolymer was about 55° C. The coating composition also contained 40 parts colloidal silica, 0.5 parts talc and 8.5 parts carnauba wax. The film was primed with polyethyleneimine (any suitable primer would be acceptable) and the coating was applied with a reverse direct gravure and dried at 104° C.

The inside of the same film was primed then coated with the nitrile containing coatings of Examples 1 and 2. The inside coating compositions also contained 4 parts carnauba wax and 0.4 parts talc. Film 1 was coated with the terpolymer of Example 1. Film 2 was coated with the terpolymer of Example 2.

Comparative Example 4

For purposes of comparison, a film was made by the same procedure as Example 3 but it was coated on both sides with a terpolymer of methyl acrylate, methylmethacrylate and methacrylic acid. The film of this example is designated Film 3.

Experimental Results

Example 5

Fifty bags were formed from films made in accordance with the above examples. The bags were loaded with four ounces of "GUMMY BEARS" supplied by Hershey on a Mirapac vertical form fill and seal machine. The bags were exposed to temperatures of 85° F. (29° C.) and 80% relative humidity for 30 days to determine their ability to resist prolonged periods of high temperatures and high humidity and exposure to contact with aggressive materials contained in the candy.

The results reported in the following table demonstrate that a temperature and humidity resistant film is obtained at higher levels of acrylonitrile and low $T_g$. Film puckering was evaluated by measuring the percentage of packages containing pocks which was determined by visually inspecting the packages and counting the number of packages that contained pocks or puckers.

TABLE 3

| Film | COATING | MONOMER RATIO | $T_g(°C.)$* | $T_g(°C.)$** | % POCKED PACKAGES | OBSERVATIONS |
|---|---|---|---|---|---|---|
| Film 1 | EA/ACN/AA | 60/37/3 | 16 | 40[b] | 2 | excellent, puckering confined to small areas of incomplete coating |
| Film 2 | MA/ACN/AA | 69/28/3 | 31 | 50[a] | 36 | acceptable, minor puckering |
| Film 3 | MA/MMA/MAA | 51.5/44.5/4 | 57 | 55 | 100 | unacceptable, severe puckering within 3 days |

*theoretical glass transition temperature
**measured glass transition temperature
MA = methyl acrylate
MMA = methylmethacrylate
MAA = methacrylic acid
ACN = acrylonitrile
AA = acrylic acid
EA = ethyl acrylate
a = The glass transition temperature was partially obscured by a melting transition which peaked at about 54° C.
b = The glass transition temperature was partially obscured by a melting transition which peaked at about 46° C.

As noted in Table 1, in Film 1, which was coated with an EA/ACN/AA terpolymer containing 37 wt. % ACN, package deformation because of puckering was limited to small areas in which there was a skip in the coating (an area of incomplete coating or a defect in the coating). Where there was a skip in the coating, the region inside the skip was severely puckered but the puckering did not propagate underneath areas which were fully coated. This lack of propagation was unexpected. Film 3 which was coated with MA/MMA/MAA and contained no ACN was seriously puckered. Comparing Film 1 with Film 2, which both contained ACN, Film 1 which contained more ACN (37 wt % vs. 28 wt. %) and which had a lower $T_g$, than Film 2 has more resistance to puckering.

Example 6

The films were also tested for protection against the reactive oils contained in ground black pepper, ground nutmeg, ground cloves and various air fresheners such as apple air freshener, orange air freshener and cedar wood blocks.

Films 1, 2 and 3 were used to make handformed packages which contained a variety of materials containing aggressive oils. It was found that the nitrile-containing coatings offer improved protection to a broad range of materials even after 1 month of conditioning at 75° to 85° F. (24° C. to 29° C.) and ambient humidity and 3 days at 85° F. (29° C.) and 80% relative humidity.

Film puckering was given a rating from 0 to 5 based upon visual observation. The ratings were as follows:

0=Unaffected
1=One or two small dimples (pass)
2=A few isolated dimples (marginal)
3=Several dimples and a few dents (fail)
4=Heavy dimples and some dents (fail)
5=Heavy dimples and heavy dents (fail)

The results of the test are reported in the following table.

TABLE 4

| | Film Puckering Test Results | | |
|---|---|---|---|
| Spice | Film 1 | Film 2 | Film 3 |
| Ground Nutmeg | 3 | 0.3 | 5 |
| Ground Black Pepper | 0 | 0.5 | 5 |
| Ground Clove | 0* | 0* | 5 |

*The spice appeared to have some interaction with the coating even though the package was substantially unaffected by the spice.

Film packages made from the Films 1, 2 and 3 were filled with apple air freshener, orange air freshener and cedar blocks. The packages were conditioned at 75°–85° F. (24° C.–29° C.) and ambient humidity for 7–8 weeks. The appearance of the films is reported in the following Table 5.

TABLE 5

| | Film Puckering | | |
|---|---|---|---|
| Spice | Film 1 | Film 2 | Film 3 |
| Apple Air Freshener | 0 | 3 | 2 |
| Orange Air Freshener | 0 | 2 | 1 |
| Cedar Blocks | 0 | 0.5 | 1 |

Example 7

The films were tested for sealability properties.
HOT TACK TEST
Hot tack was evaluated to determine whether Films 1 and 2 would run on high speed packaging equipment. In the hot tack test a film specimen is placed over a spring and bent into a "U" shape with the sealing surfaces placed together. The spring ends are closed and the sealing surfaces are placed into the jaws of a crimp sealer to make a seal. While the sealing pins are closed the spring tension is released. The amount of tension (g/in) needed to pull the seals apart is the hot tack value. A hot tack value of >150 g/in for Films 1 and 2 was demonstrated over a temperature ranging from between 160° F. and 240° F. (71° C. and 115° C.).
CRIMP SEAL STRENGTH TEST Crimp seal strength was evaluated by inserting the test film squarely between the jaws of a "WRAP-ADE" crimp sealer so that the transverse direction of the film was parallel to the jaws. The seal was formed and then tested by pulling the sealing surfaces away from each other. Seal strengths exceeded 200 g/in for both Films 1 and 2.

MINIMUM SEAL TEMPERATURE TEST

The minimum seal temperature of Films 1 and 2 was tested using a multiple bar sealer using an "ASKCO" heat sealer. A film specimen was placed over the sealer's teflon pad. The surfaces to be sealed were placed together (inside/inside or outside/outside). The films were inserted into the sealer. After the seal formed, the free ends were each placed in the clamp of a Suter Tester and pulled away from each other. The minimum seal temperature for Film 1 was about 160° F. (71° C.) and the minimum seal temperature for Film 2 was about 215° F. (122° C.).

Example 8

In this example, a coating made with over 50 wt. % acrylonitrile is described.

In making the acrylonitrile coating used in this Example, the same procedure as Example 1 was followed except the monomer composition was 35.6% methyl acrylate, 58.4% acrylonitrile, 5% acrylic acid and 1% iso-octyl thioglycolate. The latex of this example was alkali soluble, had a total solids content of 20.9, a pH of 9.8, a calculated $T_g$ of 57° C. and a residual acrylonitrile content of 9 ppm.

The monomer coating was coated to the surface of a primed 92 gauge biaxially oriented polypropylene substrate in a coating weight of approximately 0.5 g/1000 square inches as described in Example 3. The film was designated Film 4.

The oxygen transmission rate at 30° C. was 30 cc/100 square inches/day. The minimum seal temperature ranged from about 215° F.–230° F. (101°–110° C.).

For comparative purposes the oxygen barrier properties of Film 3 were tested. The oxygen barrier properties of Film 3 under the same conditions was 120 cc/100 square inches/day. Comparing Film 4 with Film 3, both accepted water and solved-based printing inks well, yet, Film 4 had a much lower propensity for picking ink from another printed surface, as compared to Film 3.

Example 9

This example describes the performance of a variety of outside formulations.

Oriented polypropylene film samples were prepared substantially as described in Example 3.

To make outside coatings used in the films of this example, coating formulations were prepared substantially as described in Example 1, except that different monomer proportions were used. The final formulation of each coating contained 0.5 parts per hundred parts monomer (phr) talc, 40 phr silica and 5 phr wax.

The inside coating used on each film was prepared substantially as described in Example 1 and contained 68 wt. % methacrylic acid, 27 wt. % acrylonitrile and 5 wt. % acrylic acid. The calculated $T_g$ was 31° C.

The coating weights ranged from about 0.55 to about 0.60 g/msi.

The monomers and monomer content of the outside coating used on each film is reported in the following table.

TABLE 6

| Film No. | Monomers | Ratio | $T_g$ °C. (calc) |
|---|---|---|---|
| 5 | MA/MMA/ACN/AA | 40/10/45/5 | 57 |
| 6 | MA/MMA/ACN/MAA | 40/10/45/5 | 59 |
| 7 | MMA/MA/MAA | 60/35/5 | 66 |

The measured $T_g$ of Film No. 5 was 149° C. (65° C.) while the measured $T_g$ of Film No. 6 was 136° F. (58° C.).

In the following Table 7, the hot slip, blocking and seal strength of Films 5, 6 and 7 are reported.

Seal strength was tested by contacting the outside coatings to the inside coating and forming a seal at 210° F. (99° C.), 2 second dwell time and 5 psi (34 kPa) in an ASKO sealer then testing seal strength by measuring the force (g/in) required to pull the sealed films apart in an Instron testing machine.

Blocking was measured by contacting the inside coatings in a laboratory press maintained at 140° F. (60° C.), 750 psi (5,171 kPa) for 72 hours. The force required to separate the films is determined by measuring the force (g/in) needed to pull the films apart in the Instron testing machine.

Hot slip is a test for machinability. Hot slip performance was evaluated by passing a sample of the coated film over an aluminum platen heated to a temperature of about 127° C. at a rate of 45 in/min. The hot slip value is a dimensionless number provided by the hot slip test machine.

TABLE 7

| Film No. | Hot Slip | Blocking (g/in) | Seal Strength (g/in) |
|---|---|---|---|
| 5 | 0.65 | 9.1 | 410 |
| 6 | 0.64 | 9.8 | 510 |
| 7 | 0.54 | 3.6 | 305 |

Example 10

This example demonstrates that films coated with the coating of this invention are resistant to the aggressive materials found in release agent coatings for chewy candies. Release agent coatings are used to prevent chewy candies from sticking together, but they have been known to deform oriented polypropylene packaging films. The data reported in the following Table 8 show that coatings containing acrylonitrile, as disclosed herein, prevent oriented polypropylene film packages from being damaged by these release agent coatings. The data also show that coatings which contain less than 25 wt. % acrylonitrile based on the entire weight of the terpolymer do not prevent package deformation as effectively.

Test packages were hand-formed from oriented polypropylene film coated with various coating formulations by known techniques. The coatings used in Films 8 to 13 were prepared in accordance with the procedure described in Example 1. The coating of Film 14 was prepared in accordance with the procedure described in U.S. Pat. No. 5,040,164. In the test, two packages were prepared for each sample.

The packages were filled with "GUMMY BEAR" candies and exposed to temperature conditions of 85° F. and 80% relative humidity for 30 days. The films were visually inspected and given a rating a 0–5, as defined in Example 6.

A passing rating was ≦1. A separate rating for each package is reported in the Table.

TABLE 8

Film Resistance to Release Agents on Chewy Candies

| Film | Coating | Monomer Ratio | $T_g$* °F. (°C.) | Ratings |
|---|---|---|---|---|
| 8 | EA/ACN/AA | 46/51/3 | 88 (31) | 4,5 |
| 9 | MA/ACN/AA | 36/59/5 | 135 (57) | 1,5 |
| 10 | EA/ACN/AA | 60/37/3 | 60 (16) | 0,0 |
| 11 | EA/ACN/AA | 60/35/5 | 60 (16) | 0,0 |
| 12 | MA/ACN/AA | 92/5/3 | 60 (16) | 3,2 |
| 13 | MA/ACN/AA | 68/27/5 | 88 (31) | 0.5,0.5 |
| 14 | MA/MMA/MAA | 51.5/44.5/4 | 135 (57) | 5,5 |

*Theoretical Value

The data in Table 8 show that packages coated with the coating composition of the present invention were resistant to the release agents coated onto "GUMMY BEAR" candies. Acrylonitrile-containing coatings having a glass transition temperature within the range of 10° C. to less than 50° C. and containing acrylonitrile in an amount of greater than 25 wt. % but less than 50 wt. %, based on the total weight of the terpolymer, achieved a rating of less than 1. In contrast, coatings with a glass transition temperature of greater than 50° C. and either less than 25 wt. % or more than 50 wt. % acrylonitrile achieved unacceptable ratings (compare Films 8–9, 12 and 14 with Films 10–11 and 13). Comparing Films 12 and 14, it is apparent that although the presence of acrylonitrile enhanced resistance to the release agents, the results were unacceptable because the amount of acrylonitrile was too low. In Film 9, a relatively good rating of 1 was achieved; however, it was observed that any significant flexing of the package (which would occur during normal handling) caused the package to fail the test.

What is claimed is:

1. A heat sealable polyolefin film comprising a polyolefin substrate having a first side and a second side, (1) the first side having (a) a polymeric coating comprising:
   (i) more than 25 wt. % and up to about 50 wt. % of at least one monomer selected from the group consisting of acrylonitrile and methacrylonitrile;
   (ii) from about 40 to about 75 wt. % of at least one monomer selected from the group consisting of methyl acrylate, ethyl acrylate and methyl methacrylate;
   (iii) from about 1 to about 10 wt. % of at least one monomer selected from the group consisting of acrylic acid or methacrylic acid,
      the monomers being combined in weight percent amounts based on the total weight of the polymeric coating sufficient to achieve a calculated glass transition temperature ranging from about 10° C. to less than about 50° C., (2) the second side having (b) a coating comprising 25 to about 80 wt. % of at least one monomer (i) selected from the group consisting of acrylonitrile and methacrylonitrile; about 40 wt. % to about 75 wt. % of at least one monomer (ii) selected from the group consisting of methyl acrylate, ethyl acrylate or methyl methacrylate; and about 1 to about 10 wt. % of at least one monomer (iii) selected from the grout consisting of acrylic acid and methacrylic acid; the combined monomers having a calculated $T_g$ ranging from about 10 to about 80° C., the (a) polymeric coating being sealable to the (b) coating at temperatures ranging from about 70° C. to about 125° C.

2. The heat sealable film as described in claim 1 in which the (b) coating further comprises an antiblocking agent.

3. The heat sealable film of claim 1 in which there is an aggressive material (i) in the polyolefin substrate or (ii) in contact with the (a) or (b) coating of the polyolefin substrate.

4. The heat sealable film of claim 3 in which the aggressive material is selected from the group consisting of a terpene; a release agent; and a naturally or synthetically scented oil.

5. A heat sealable film comprising a polyolefin substrate having an inside surface and an outside surface, (1) the inside surface having (a) a heat sealable polymeric coating comprising:
   (i) more than 25 wt. % to about 50 wt. % of at least one monomer selected from the group consisting of acrylonitrile and methacrylonitrile;
   (ii) from about 40 to about 75 wt. % of at least one monomer selected from the group consisting of methyl acrylate, ethyl acrylate and methyl methacrylate;
   (iii) from about 1 to about 10 wt. % of at least one monomer selected from the group consisting of acrylic acid or methacrylic acid,
      the monomers being combined in weight percent amounts based on the total weight of the polymeric coating sufficient to achieve a calculated glass transition temperature ranging from about 10° C. to about 50° C., (2) the outside surface having (b) a coating comprising 25 to about 80 wt. % of at least one monomer (i) selected from the group consisting of acrylonitrile and methacrylonitrile; about 40 wt. % to about 75 wt. % of at least one monomer (ii) selected from the group consisting of methyl acrylate ethyl acrylate or methyl methacrylate; and about 1 to about 10 wt. % of at least one monomer (iii) selected from the group consisting of acrylic acid and methacrylic acid, the combined monomers having a calculated $T_g$ ranging from about 10 to about 80° C., the (a) heat sealable polymeric coating being sealable to the (b) coating at temperatures ranging from about 70° C. to about 125° C.

6. The heat sealable film as described in claim 5 in which the (b) coating further comprises an antiblocking agent.

7. A heat sealable film comprising a polyolefin substrate having an inside surface and an outside surface, (1) the inside surface having (a) a heat sealable polymeric coating comprising:
   (i) more than 25 wt. % to about 50 wt. % of a nitrile monomer having the formula:

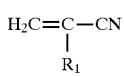

where $R^1$ is hydrogen or methyl;
   (ii) from about 40 to about 75 wt. % of at least one monomer selected from the group consisting of an alkyl acrylate having the structural formula:

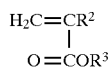

where $R^2$ is hydrogen or alkyl containing from 1 to 4 carbon atoms and $R^3$ is an alkyl group containing from 1 to 10 carbon atoms and 1,3-butadiene;

(iii) from about 1 to about 10 wt. % of at least one monomer selected from the group consisting of an alpha or beta ethylenically unsaturated carboxylic acid or sulfoethylmethacrylate, the monomers being combined in weight percent amounts based on the total weight of the polymeric coating sufficient to achieve a calculated glass transition temperature ranging from about 10° C. to about 50° C., (2) the outside surface having (b) a coating comprising an acrylic-based coating composition comprising about 40 to about 80 wt. % of a nitrile monomer having the formula:

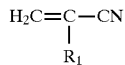

where $R^1$ is hydrogen or methyl, the (b) coating having a calculated $T_g$ ranging from about 35° C. to about 80° C., the (a) heat sealable polymeric coating being sealable to the (b) coating at temperatures ranging from about 70° C. to about 125° C.

8. The heat sealable film as described in claim 7 in which the (a) coating comprises (i) a nitrile selected from the group consisting of acrylonitrile and methacrylonitrile; (ii) a monomer selected from the group consisting of methyl acrylate, ethyl acrylate or methyl methacrylate and (iii) a monomer selected from the group consisting of acrylic acid or methacrylic acid.

9. The heat sealable film as described in claim 8 in which the (b) coating comprises a nitrile monomer selected from the group consisting of acrylonitrile or methacrylonitrile.

10. The heat sealable film as described in claim 8 in which the (b) coating further comprises from about 40 wt. % to about 70 wt. % of a (ii) monomer which is methyl acrylate and methyl methacrylate and about 1 wt. % to about 10 wt. % of at least one monomer selected from the group consisting of acrylic acid and methacrylic acid.

* * * * *